United States Patent [19]

Lacord et al.

[11] Patent Number: 4,789,870

[45] Date of Patent: Dec. 6, 1988

[54] METHOD AND DEVICE FOR CONTROLLING A THERMAL PRINTING HEAD

[75] Inventors: Maurice Lacord, Eragny; Christian Lavergne, Herblay; Patrick Vegeais, St. Germain en Laye, all of France

[73] Assignee: Societe d'Applications Generales d'Electricite, Paris, France

[21] Appl. No.: 55,120

[22] Filed: May 28, 1987

[30] Foreign Application Priority Data

Jun. 5, 1986 [FR] France ............................... 86 08125

[51] Int. Cl.[4] ............................................ G01D 9/00

[52] U.S. Cl. ................................ 346/1.1; 346/76 PH; 400/120

[58] Field of Search ................. 346/1.1, 76 PH, 76 R; 400/120, 120 PH; 219/216, 216 PH

[56] References Cited

U.S. PATENT DOCUMENTS 4,262,188 4/1981 Beach .
4,309,712 1/1982 Iwakura .
4,473,829 9/1984 Schouhamer Immink et al. ........................................ 346/1.1
4,540,295 9/1985 Okunishi et al. .
4,636,810 1/1987 Asakura et al. .

FOREIGN PATENT DOCUMENTS 3315257 11/1983 Fed. Rep. of Germany .
7343646 7/1975 France .
8304232 9/1983 France .

*Primary Examiner*—E. A. Goldberg
*Assistant Examiner*—Huan H. Tran
*Attorney, Agent, or Firm*—Stevens, Davis, Miller & Mosher

[57] ABSTRACT

A thermal series type printing head is controlled on-the-fly, during a succession of cycles of a duration at most equal to the time for printing the points, so as to be heated independently during the first half and during the second half of each cycle. Thus an offset dot can be printed of half a length of a a normal dot, or an extended dot, one and half times as long as the normal dot, for improving the definition of printing without reducing the writing speed. The invention applies to printing systems, particularly for printers connected to word processing devices.

8 Claims, 9 Drawing Sheets

METHOD AND DEVICE FOR CONTROLLING A THERMAL PRINTING HEAD

BACKGROUND OF THE INVENTION

1. Field of the Invention

The present invention relates first of all to a method for controlling a thermal printing or writing head of series type for a printing system, particularly for a printer connected to a word processing device.

2. Description of the Prior Art

A thermal writing head generally includes a plurality of heating elements, generally resistive elements adapted so as to have a current flowing therethrough, and to cooperate either directly with a printing medium, for example a thermosensitive paper, or indirectly with an ordinary printing medium, through a ribbon coated with an ink melting under the heat of the elements. In the first case, it is a question of direct thermal printing and in the second case thermal transfer printing.

The invention relates to series type thermal printing and, in this case, the mobile head has at least one generally vertical strip of elements, aligned in a direction orthogonal to the direction of rectilinear movement, during the printing of a line of graphics corresponding to the height of a strip, of a carriage supporting the head.

More particularly, the invention relates to a method for controlling a series type thermal writing head for a printer having a strip of heating elements, in which:

said head is driven with a longitudinal movement along a line to be printed, at a given speed, the heating elements being subjected to thermal cycles, each including an initial heating time and a cooling time, for printing dots.

In this method, the assembly of heating elements which are heated during the same cycle depends obviously on the configuration of the cross section of the line to be printed, the dimension of which is L, equal to the product of the moving speed multiplied by the duration T of the cycles.

In such a method, and taking for example the extremely frequent case in which the line is written horizontally, the vertical definition depends solely on the size and spacing of the heating elements of the writing head. On the other hand, the horizontal definition is approximately inversely proportional to the speed of driving the head. In fact, taking into account the thermal inertia of a heating element, it is not possible to make the time interval as small as desired during which it is hot enough for printing. Since this time interval is then defined by a lower limit, the horizontal dimension of the "dot" which it prints is therefore substantially inversely proportional to the speed of driving the head.

In the above defined method, a compromise must then be found between the horizontal definition and the writing speed of the head.

The aim of the present invention is to obtain a better compromise, that is to say better horizontal definition for a constant writing speed or a higher writing speed for equivalent horizontal definition.

SUMMARY OF THE INVENTION

For this, the present invention provides a method of the above defined type in which the duration of the cycles is chosen at most equal to the time of printing the dots and some of the heating elements are heated during at time beginning in the middle of the cycles.

In the case where a heating element is subjected to initial heating for a non zero time, the invention provides then for heating it a second time within the same cycle.

When the heating element is subjected to two successive heating operations during the same cycle, it prints an "extended dot". The beginning of this extended dot coincides with the beginning of a normal dot, but its length is greater than that of the normal dot.

On the contrary, if the initial heating time of the element is zero, within a cycle, the invention only causes it to be subjected to heating from the middle of a cycle. In this latter case, the heating element prints an offset dot. The beginning of this offset dot is offset by half the width of a section with respect to a normal dot.

It can then be seen that without reducing the driving speed of a head, this latter is able to print on-the-fly, in addition to a normal dot, an offset dot and an extended dot. This allows the horizontal definition of each line to be improved, which gives a better printing quality, in particular in so far as the reproduction of oblique bars are concerned frequently met with in alpha-numeric characters. Taking into account the fact that these latter are less slanted with respect to the vertical than with respect to the horizontal, the fact that the vertical resolution remains unchanged, and the fact that the horizontal dimension of the dot is not reduced have an imperceptible influence on the final quality of the printing.

In the preferred embodiment of the method of the invention, the initial heating time and the time of heating beginning in the middle of the cycles are less than half the duration of the cycle.

In this case, the offset dot has the same length as the normal dot and the extended dot has a length substantially equal to one and a half times the length of the normal dot. Since the possible offset is equal to half a normal dot length, it may be considered that a "pseudo resolution" is obtained twice the original resolution. A true double resolution would in fact imply the length of the dot being divided by two, which is not the case.

Advantageously, the time of heating a heating element during a first half cycle is modulated and determined so as to shorten this time if this heating element has been heated during one of the two preceding half cycles and the time of heating a heating element during a second half cycle is modulated and determined so as to shorten this time if this heating element has been heated during one of the three preceding half cycles.

In another embodiment of the method of the invention, the writing head is provided with a first and second tranverse strip disposed one after the other in the longitudinal direction, and in which, during a cycle of uneven order, the heating elements of the second strip are subjected to no heating and, during a cycle of even order, the heating elements of the first strip are subjected to no heating.

The invention also provides a device for implementing the method of the invention, including:

means for driving said head in a longitudinal movement along a line to be printed, at a given speed, means for heating said heating elements, means for calculating the heating time controlling said heating means for subjecting said heating elements to heating cycles each including an initial heating time and a cooling time, for printing dots, in which device the calculating means include means for adjusting the cycle time to a time at least equal to the printing time of the dots, means for determining certain heating elements which are to be subjected to heating from the middle of the cycles, and are adapted so as to control said heating means so as to cause heating of said given heating elements for a time beginning in the middle of the cycles.

BRIEF DESCRIPTION OF THE DRAWINGS

The invention will be better understood from the following description of the preferred way of putting the method into practice, and the preferred embodiment of the device of the invention, with reference to the accompanying drawings in which.

DESCRIPTION OF THE PREFERRED EMBODIMENT

Figure 1:
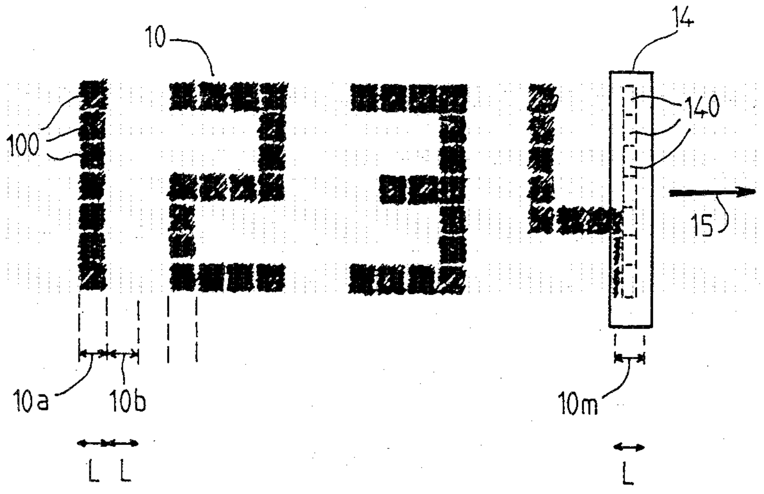
FIG. 1 shows schematically a line of characters being printed by a first writing head.

Referring to FIG. 1, in a data transmission printer, for example, for printing a line of characters 10 by means of a series type thermal printing head 14, the head 14 is driven with a longitudinal movement, here horizontal, along the line to be printed 10, in the direction of arrow 15, by means of a drive device which is not shown because it is known per se.

Line 10 is broken down into a series of transverse sections 10*a*, 10*b* . . . 10*m*, . . . whose horizontal dimension is equal to the horizontal dimension, or length, L of an elemental dot 100 which each of the heating elements 140 may print when it is heated. The heating elements 140 are spaced apart along a transverse strip, here vertical, whose height corresponds then to the height of line 10.

Thus, each section 10*m* is printed during a writing cycle whose duration T is equal to the length L of a dot 100, divided by the driving speed of head 14.

Each of the heating elements 140 is here a resistive element, individually accessible through connections not shown in FIG. 1 for the sake of simplicity. The method of controlling one of these heating elements 140 will now be described, whose task is obviously to print a succession of dots whose configuration depends on the line to be printed.

Figure 2:
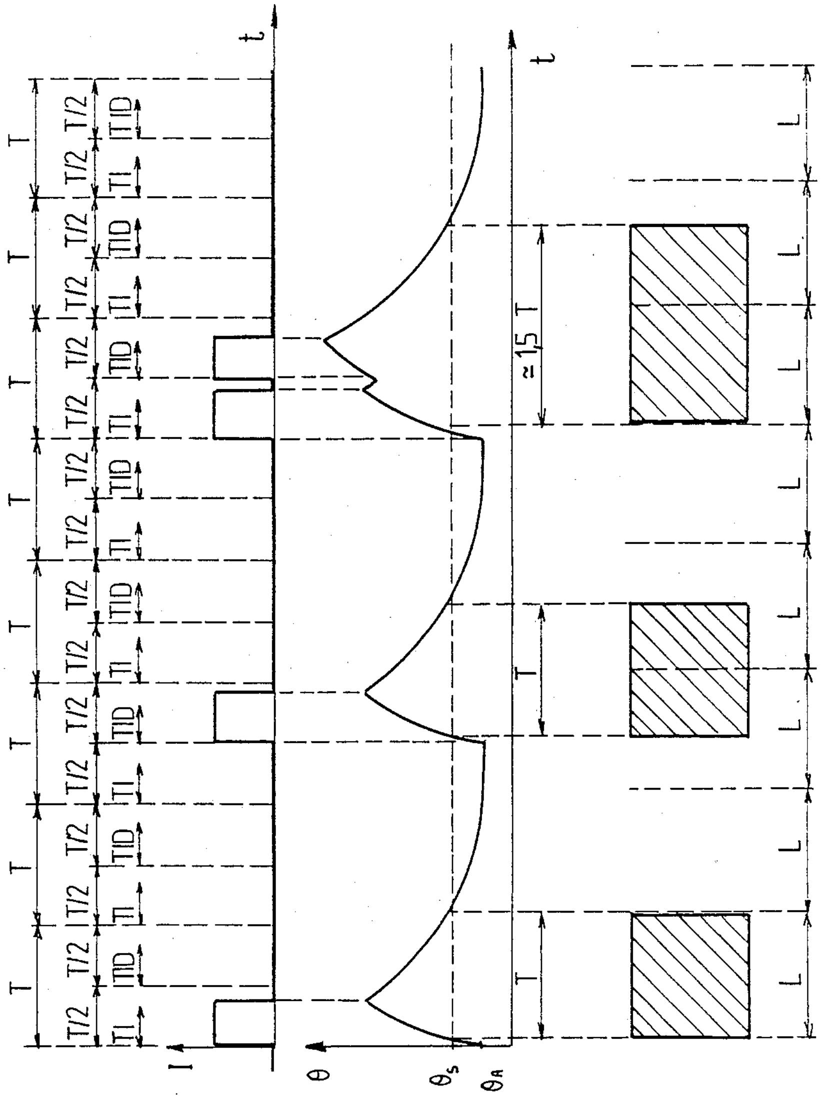
FIG. 2 shows a first timing diagram of the control current, of the temperature and of the writing associated with a heating element of the head of FIG. 1.

Referring to FIG. 2, each writing cycle of duration T is divided into two half cycles of duration T/2. At the beginning of each half cycle the heating element considered is caused to be heated for a duration TI for each first half cycle and for a duration TID for each second half cycle.

Here, the heating element is heated by causing a current I to flow therethrough so that, taking into account its thermal inertia, after heating for the time TI or for the time TID, its temperature $\theta$ remains higher than a threshold temperature $\theta s$ for a time equal to T. Since the threshold temperature $\theta s$ is that beyond which the paper is printed, the dot printed by the heating element heated for a time TI or TID corresponds to the length L.

As shown in FIG. 2, there are four possibilities for controlling each cycle. These four possibilities are:

(a) no heating: no printing (b) heating for the first half cycle only: printing of a normal dot of length L (c) heating during the second half cycle only: printing of a dot offset by length L (d) heating during both half cycles: printing of an extended dot of length slightly greater than 1.5 L.

In fact, in this latter case (d) the fact that the heating element is heated during the first half cycle means that the temperature reached during the second half cycle, at the end of time TID, is greater than that reached at the same time in case (c), for example. The result is, on the other hand, a risk of the temperature exceeding the maximum value $\theta max$ admissible by the heating element and, on the other hand, streaking of the writing of the extended dot, which will be a little longer than 1.5 L.

Figure 3:
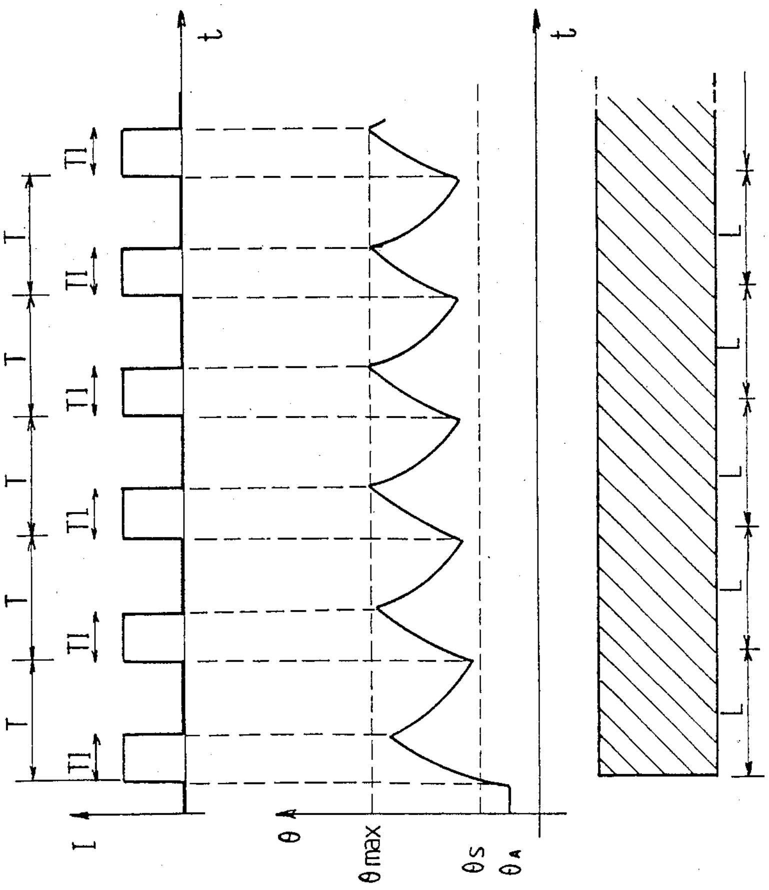
FIG. 3 shows a second timing diagram of the same type as that of FIG. 2.

Such a drawback is met with in other situations and, in particular during writing of an uninterrupted succession of normal dots, as shown in FIG. 3. In this Figure the fact that the temperature $\theta$ of the heating element has not yet dropped back to the ambient temperature $\theta a$ at the end of a writing cycle during which a dot has been effectively printed results in a cumulative increase of the temperature from cycle to cycle and an inadmissible overshoot of the maximum temperature $\theta max$.

To overcome this drawback, the times TI and TID of the heating phases are modulated so as to shorten them if the heated element is still hot at the beginning of each of these phases. Thus, the heating time TI during a first half cycle takes on the value T1 if the heating element has not been heated during any of the two half cycles preceding this first half cycle; in the opposite case, the time TI takes on the value T2, with:

$$T2 < T1$$

Similarly, the heating time TID during a second half cycle takes on the value T1D if the heating element has not been heated during any of the three half cycles preceding this second half cycle; in the opposite case, time TID takes on the value T2D, with:

$$T2D < T1D$$

Here, the following are selected $$T1 = T1D$$

$$T2 = T2D$$

Figure 4:
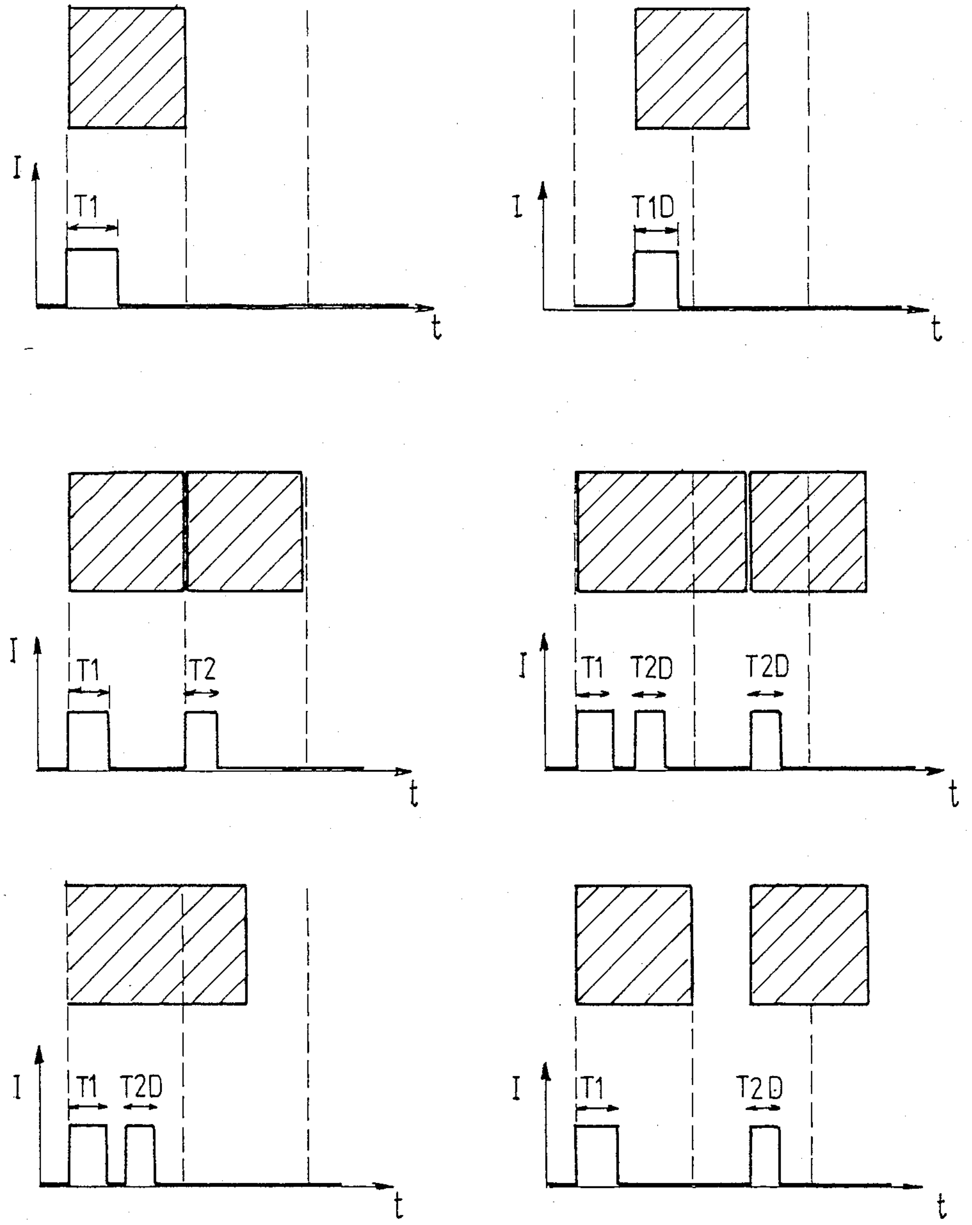
FIG. 4 shows six timing diagrams for six control currents and the six writing operations associated with the heating element of the head of FIG. 1.

FIG. 4 shows by way of example a certain number of configurations to be printed and the trend of the heating current I.

Figure 5:
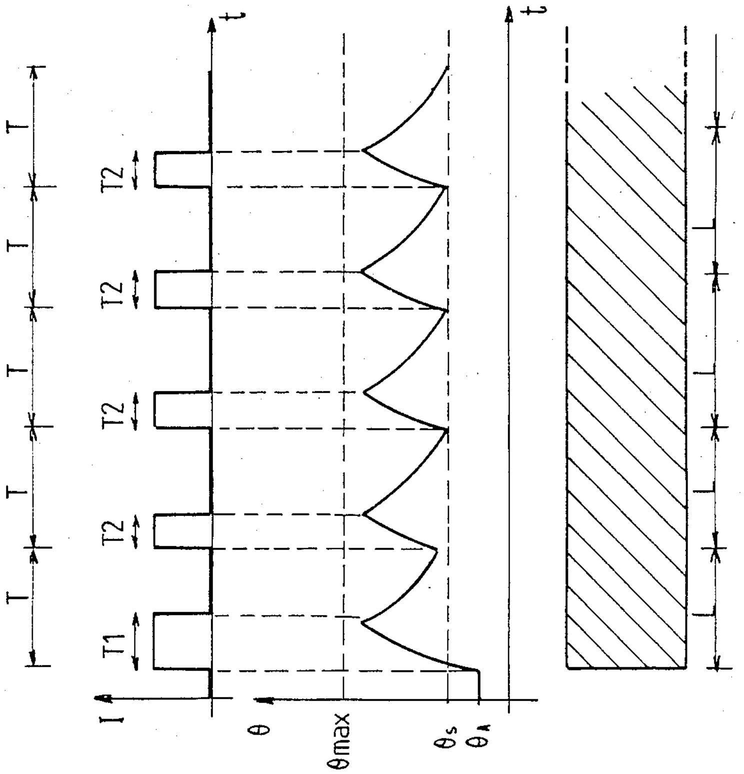
FIG. 5 shows a third timing diagram of the same type as that of FIG. 2.

FIG. 5 shows the result obtained in the case, similar to that of FIG. 3, of writing an uninterrupted succession of normal dots. It shows that the temperature remains less than the maximum temperature $\theta$max.

Of course, since the writing head 14 is provided with a plurality of heating elements 140 spaced apart on a vertical strip, at each half cycle of a cycle a first assembly of parts is heated which corresponds to the configuration of the first half section of the section to be written corresponding to the cycle considered and at each half cycle, a second assembly which correspond to the configuration of the second half section.

Figure 6:
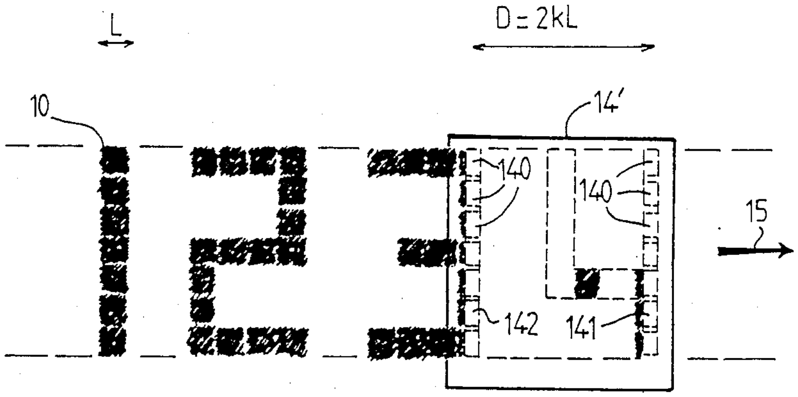
FIG. 6 shows schematically a line of characters being printed by a second writing head.

In the practice of the method of the invention which has just been described, the thermal stresses on the heating element are fairly severe, in particular when writing a continuous horizontal line where the temperature $\theta$ permanently remains higher than the writing threshold $\theta$s. The result is that the lifespan of the heating elements and so of the head is relatively short. To avoid this drawback a head 14' may be used, in a way known per se and as shown in FIG. 6, having two transverse strips 141 and 142 disposed one after the other in the longitudinal direction, and spaced apart by a length D equal to an even number of times length L:

$$D=2kL$$

with k a natural integer and D measured between the axes of each of the two columns.

In this case, the first strip 141 is active during writing cycles of uneven order, whereas it is at rest during writing cycles of even order. On the other hand, the second strip 142 is active during writing cycles of even order and at rest during writing cycles of uneven order. That is to say that the first strip 141 only prints the sections of uneven order, whereas the second strip 142 only prints the sections of even order. Naturally, as shown in FIG. 6, writing is only complete after the two strips have passed.

The result is that each writing cycle during which an element has been heated is necessarily followed by a writing cycle during which it may cool down. The thermal stresses are therefore reduced and the lifespan increased.

Figure 7:
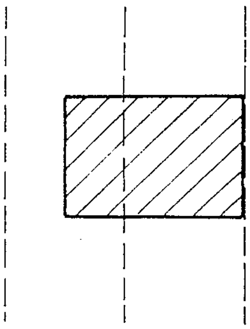
FIG. 7 shows the configuration of an "offset extended dot" printable by the head of FIG. 6

Furthermore, considering a given section, if the strip which prints this section is controlled to print an offset dot, and the other strip to print a normal dot at the same height as the offset dot in the next section, a fifth printing possibility (f) may be obtained which is the "extended offset dot" shown in FIG. 7.

Taking into account the very principle of thermal printing, the part common to the offset dot and to the normal dot shows no difference of tint for the whole of the ink of the thermosensitive paper, in the case of direct printing, or of the ribbon immobile with respect to the paper, in the case of transfer printing, is released by the first heating element.

Figure 8:
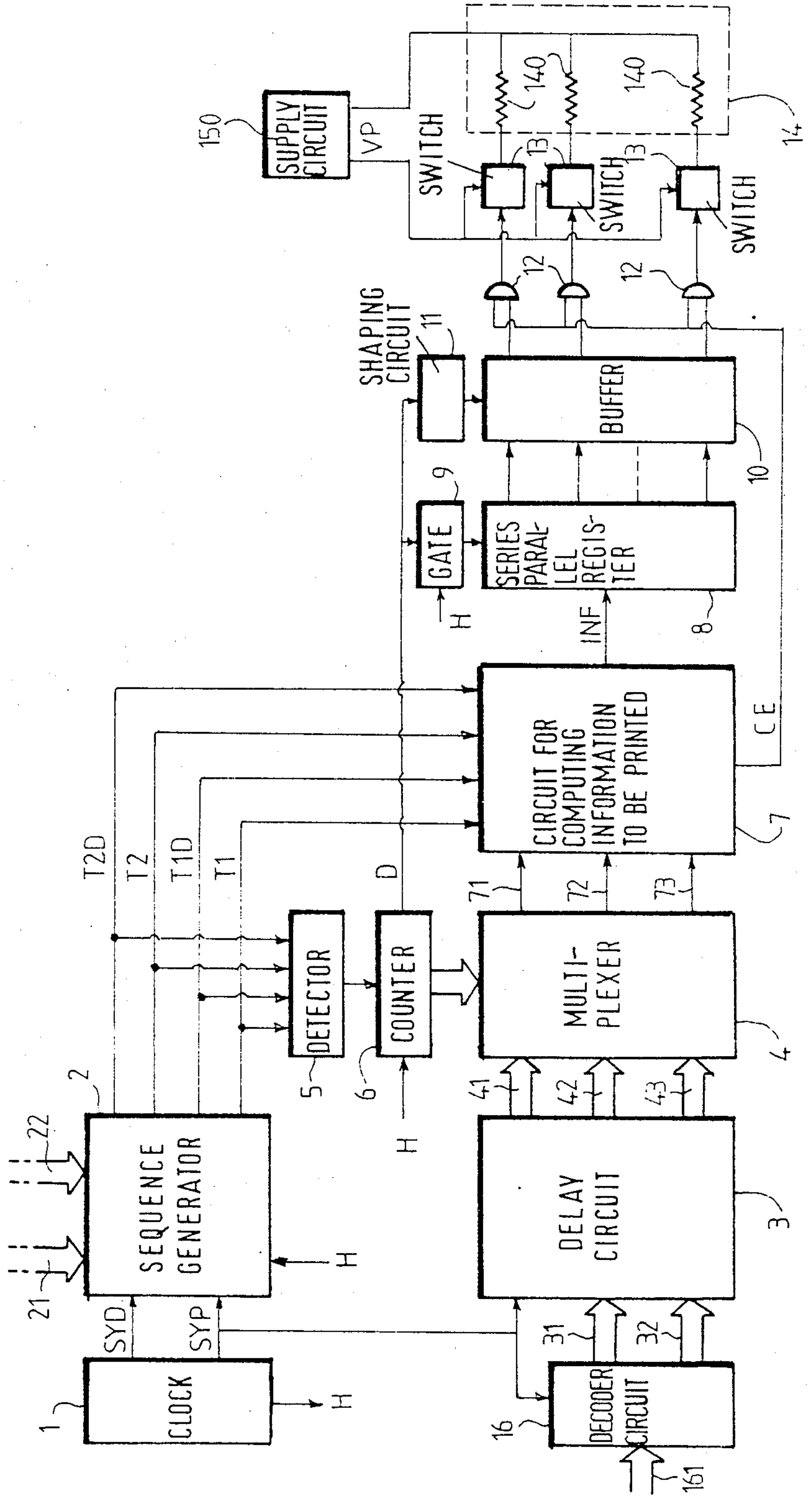
FIG. 8 shows a block diagram of a device for controlling the head of FIG. 1.

For implementing the method of the invention, the device shown in FIG. 8 is used which receives on a bus 161 the data to be printed in the form of a digital signal and which controls the resistive elements 140 of head 14, having here a single strip of J elements.

Referring then to FIG. 8, a clock 1 of known type delivers, at 3 outputs, 3 clock signals SYP, SYD and H.

A sequence generator 2 receives the three signals SYP, SYD and H at three binary inputs and two digital signals, over two buses 21 and 22, at two digital inputs. It delivers four sequential signals T1, T1D, T2 and T2D at four binary outputs.

A decoder circuit 16 receives the data coded in digital form, over bus 161, at a digital input, as well as the signal SYP at a binary input. It delivers two groups of J binary output signals on two buses 31 and 32 of parallel J bits type, that is to say each having J parallel conductors.

A delay circuit 3 receives signal SYP at a binary input and is connected to the buses 31 and 32. The delay circuit 3 delivers 3 groups of J binary output signals on three buses 41, 42 and 43 of parallel J bits type.

A multiplexer 4, of known type, a digital control input of which is connected to the digital output of a counter 6, receives the signals from the three buses 41, 42, and 43 and delivers three binary output signals at three outputs 71, 72, and 73.

Counter 6 is a J modulo counter, of known type, whose clock input receives the signal H and whose reset input receives the output signal of a detector 5 detecting the rising fronts of the sequential signals T1, T1D, T2 and T2D, which it receives at four binary inputs. Counter 6 delivers a signal D at its overflow output.

A circuit 7 for computing the information to be printed is provided with three binary inputs connected to the outputs 71, 72 and 73 and four binary inputs receiving the sequential signals T1, T1D, T2 and T2D. It delivers, at two binary outputs, two output signals INF and CE.

A register 8, of known type with series input and parallel J bit output, receives at a clock input the signal H after passage through a logic gate 9 controlled by the signal D.

The J conductors of the parallel output of register 8 are connected to a buffer register 10 with parallel input and output, controlled by signal D after passage through a shaping circuit 11.

The J conductors of the parallel output of register 10 are connected to J AND gates 12 whose other J inputs receive the signal CE.

The output of each AND gate 12 is connected to the control input of a controllable switch 13 disposed between a first terminal of a supply circuit 150 delivering the voltage VP and a terminal of one of the J resistive heating elements 140 whose other terminal is connected to the second terminal of the supply circuit 150.

Naturally, the supply circuit 150 also supplies with electric power all the elements of the preceding circuits, in a way not shown for the sake of simplicity.

Before describing in greater detail the construction of the box of the device of FIG. 8, its operation will be described first of all.

Figure 9:
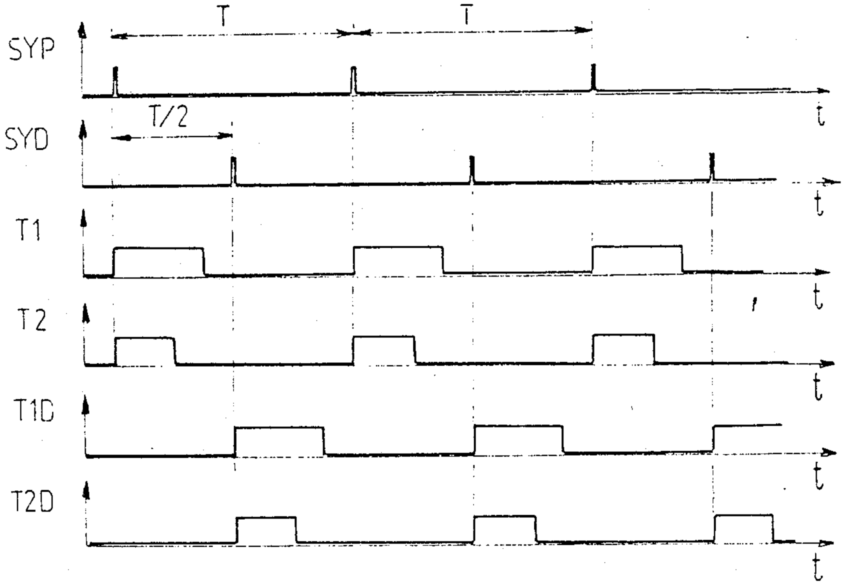
FIG. 9 shows a timing diagram for the input and output signals of the sequence generator of the device of FIG. 8.

Clock 1 delivers the signals SYP and SYD shown in FIG. 9, that is to say trains of pulses at a recurrence frequency equal to 1/T and offset with respect to each other by T/2. Signal H, not shown, is a pulse train like signals SYP and SYD, but of a much higher recurrence frequency.

The sequential signals T1, T1D, T2 and T2D have the trend shown in FIG. 9. The signals T1 and T1D are at the high level during equal times offset by T/2, like the signals T2 and T2D. The duration of the high level sequences of signal T2 is less than the duration of the high level sequences of signal T1. Signals T1 and T2 pass to the high level during each pulse of signal SYP.

Signals T1D and T2D pass to the high level during each pulse of signal SYD.

The decoder circuit 16 elaborates, as a function of the data which it receives over bus 161, two groups of J binary signals which possibly change at each pulse of signal SYP.

After the pulse of rank i of signal SYP, the J binary signals of the first group are: $n_1^i, n_2^i, \ldots, n_j^i, \ldots, n_J^i$.

At the same time, the J binary signals of the second group are: $p_1^i, p_2^i, \ldots, p_j^i, \ldots, p_J^i$.

These two binary signals $n_j^i$ and $p_j^i$ represent two bits for controlling the heating element 14 of rank j, for printing the section of rank i, in accordance with the following code

| $n_j^i$ | $p_j^i$ | controlled printing |
|---|---|---|
| 0 | 0 | no printing |
| 1 | 0 | normal dot |
| 0 | 1 | extended dot |
| 1 | 1 | offset dot |

The J signals of type $n_j^i$ are transported by bus 31 and the J signals of type $p_n^i$ are transported by bus 32.

The delay circuit 3 delays these signals so as to deliver the three groups of J signals of type $n_j^{i-1}$ $n_j^{i-2}$, and $p_j^{i-1}$ on the three buses 41, 42 and 43 respectively.

After each rising front of one of the sequential signals T1, T1D, T2 and T2D detected by the rising front detector 5, counter 6 is reset and controls, at the timing of the clock signal H, the time multiplexing of buses 41, 42 and 43 at the binary output 71, 72 and 73.

The circuit 7 for computing the information to be printed calculates a binary signal INF which is at the high level if the heating element of rank j is to be heated and at the low level in the opposite case, for each of the four time intervals T2, (T1–T2), T2D, and (T2D–T1D) of the section of rank (i−1), so as to heat during the time T1 or the time T2, and during the time T1D or the time T2D as a function, on the one hand, of the control for the section of rank (i−1), and, on the other, of the state passed to during the section of rank (i−2) of this element, in accordance with the described methods. The computing circuit 7, from the seven signals which are applied thereto, $p_j^{i-1}$, $n_j^{i-2}$, $n_j^{i-1}$, T1, T1D, T2 and T2D calculates the signal INF for the element or rank j in the following way:

$$INF = T2 \cdot p_j^{i-1} \cdot \overline{n_j^{i-1}} + T2 \cdot \overline{p_j^{i-1}}\, n_j^{i-1} + T1 \cdot p_j^{i-1} \cdot \overline{n_j^{i-1}} \cdot \overline{n_j^{i-2}} + T1 \cdot \overline{p_j^{i-1}} \cdot n_j^{i-1} \cdot \overline{n_j^{i-2}} + T2D \cdot p_j^{i-1} + T1D \cdot p_j^{i-1} \cdot n_j^{i-1} \cdot \overline{n_j^{i-2}}$$

In way known per se, the J values of signal INF calculated after each other by the computing circuit 7 are stored in the series-parallel register 8, after each rising edge of one of the sequential signals T1, T1D, T2 and T2D, then transferred to the buffer register 10 which, through the AND gates 12, controls the heating of the heating elements 14. The AND gates cannot be enabled if the signal CE is of a high level. This signal CE is elaborated by the computing circuit 7 to be at the low level when the signal T1 and the signal T1D are normally at the low level, so as to ensure, even in the case of a malfunction of the circuits placed upstream of gates 12, for example of TI or TID remain at the high level at the end of the current half cycle, periodic cooling of the heating element so as to avoid their destruction.

The current I which flows in each heating element 14 is here equal to the voltage VP divided by the value of the resistance of a heating element.

Figure 10:
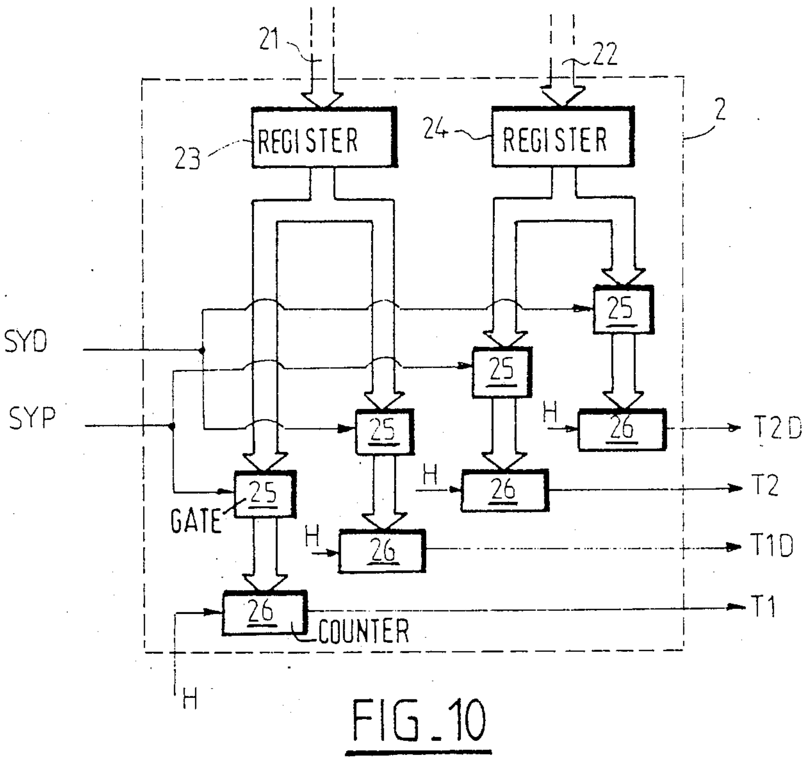
FIG. 10 shows a detailed diagram of a sequence generator of the device of FIG. 8.

The construction of the sequence generator is shown in FIG. 10. Two registers 23 and 24 receive the digital signals present on buses 21 and 22 which, as will be seen further on, control the times of signals T1 and T1D on the one hand and T2 and T2D on the other. The output of register 23 is applied to two gate circuits 25 controlled by the signals SYP and SYD. Similarly, the output of register 24 is applied to two gate circuits 25 controlled by the signals SYP and SYD. Four counters 26, each provided with a clock input receiving the signal H and a parallel input receiving the output of one of gates 25, deliver, at their four signal outputs, the signals T1, T1D, T2 and T2D.

The operation of circuit 2 is the following. Each counter 26 is connected as a down counter and its sign input is therefore positive, after being loaded to the digital output value of the corresponding gate 25, only for a time which depends on this digital value. Thus the signals shown in FIG. 9 are obtained, the digital signal on bus 21, controlling the times, equal, of signals T1 and T1D and the digital signal on bus 22 controlling the times, equal, of the signals T2 and T2D. These times may therefore be adjusted by the operator so as to adapt the device to the characteristics of the heating elements of the writing head, while modifying the digital signals applied to buses 21 and 22.

The decoder circuit 16 includes a memory which contains the different sequences of bits $n_j^i$ and $p_j^i$ corresponding to the different alphanumeric characters to be written, whose printing quality will obviously be better, considering the possibilities specific to the method of the invention for printiong an offset dot and an extended dot. This memory is addressed by addressing circuits of known type, in response to the coded data received over bus 161. The decoder circuit is therefore of known type, within the scope of a man skilled in the art and will not be described further.

Figure 11:
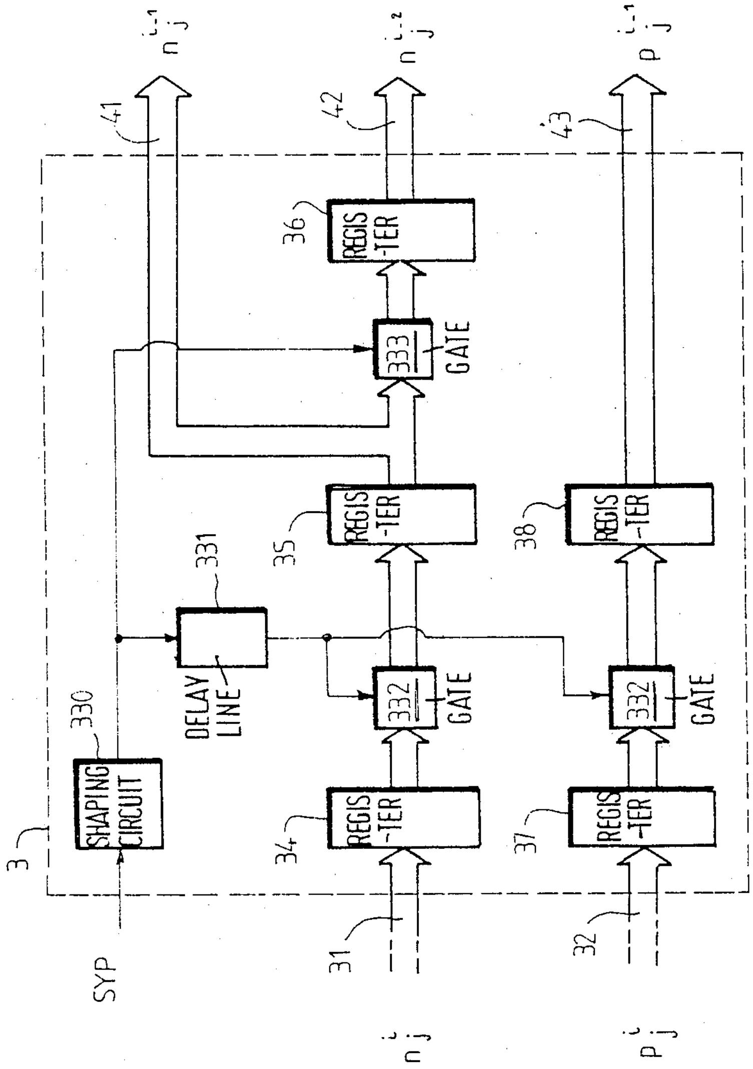
FIG. 11 shows a detailed diagram of the delay circuit of the device of FIG. 8.

The delay circuit 3 is shown in FIG. 11. It includes, on the one hand, three buffer registers 34, 35 and 36 connected in cascade between bus 31 and bus 42 and, on the other hand, two buffer registers 37 and 38 connected in cascade between bus 32 and bus 43. A shaping circuit 330, whose input receives the signal SYP, outputs a signal which controls, on the one hand, a gate circuit 333 inserted upstream of register 36 and, on the other, and after passing through a delay line 331 two gate circuits 332 each inserted upstream of registers 35 and 38. The delay of the delay line 331 corresponds to the time required for transferring the data from a register such as register 34 to the following one such as register 35, through a gate circuit 332. The bus 41 is shunt connected to the output of register 35, upstream of gate 333. The operation of such a circuit is obvious for a man skilled in the art.

The rising front of detector 5, as well as circuit 7, computing the information to be printed, are conventional combinatory logic circuits, whose design is within the scope of a man skilled in the art, and will not be described further.

Naturally, in the case where a head is used having two transfer strips, each of the strips is controlled by a device identical to that shown in FIG. 8, except that a single decoder 16, common to both devices, is used.

It is within the scope of a man skilled in the art to design the coupling for these two devices, through common clock controlling on the one hand each of the clocks 1 of each of the devices and, on the other, a routing circuit disposed at the output of the common decoder 16 for alternately routing the control bits $n_j^i$ and $p_j^i$ to each of the devices.

In the description which has just been made, the current I for heating the resistive elements is constant and its time of application variable. In addition, the times of the high level sequences of signals T1 and T1D, on the one hand, and of T2 and T2D on the other are equal. Moreover, these times are less than the time T/2 of a half cycle. These characteristics, which provide a relatively simple control and reduction of the thermal stresses on the heads are not obligatory.

The heating may in particular be modulated by varying the current I rather than its time of application, or else by varying both. Similarly, the high level sequence times of signals T1, T1D, T2 and T2D may be chosen at will, as long as they remain however less than the duration T of a cycle, in the cases where the head may withstand the resulting thermal stresses and where it is not desired to obtain dots of constant length.

Finally, the heating system by causing a current to flow through a resistive element may be replaced by any other heating system, for example by radiation, which may be suitable for thermal printing.

What is claimed is:

1. A method of controlling a series-type thermal writing head for a printing system, the head having at least one transfer strip of heating elements for printing dots on a recording medium, said method comprising:

(a) driving said head longitudinally along a line at a given speed;

(b) subjecting each of the heating elements to a succession of thermal cycles, each of said cycles having a time duration less than or equal to a time required for the heating element to print a dot on the recording medium;

(c) during a first half cycle of each of said cycles subjecting each of the heating elements respectively to one of a non-zero and a zero initial heating time in accordance with whether a dot is to be printed or not printed by the respective heating element during said first half cycle;

(d) during a second half cycle of at least one of said cycles subjecting at least one of the heating elements subjected to a non-zero initial heating time during said first half cycle to a second non-zero heating time to print an extended dot; and (e) during a second half cycle of at least one of said cycles subjecting at least one of the heating elements subjected to a zero initial heating time during said first half cycle to a second non-zero heating time to print an offset dot.

2. The method as in claim 1, wherein said one of said non-zero and zero heating time in step (c) and said second non-zero heating time in steps (d) and (e) are less than half the duration of one of said thermal cycles.

3. The method as in claim 1, further comprising modulating the heating time of a particular heating element during a first half cycle of at least one of said cycles so as to shorten a heating time during said first half cycle if said particular heating element has been heated during at least one of an immediately preceding second half cycle and first half cycle, and modulating the heating time of a given heating element during a second half cycle of at least one of said cycles so as to shorten said heating time during said second half cycle if said given heating element has been heated during at least one of an immediately preceding two first half cycles and an immediately preceding second half cycle.

4. The method as in claim 1, wherein said writing head includes first and second transfer strips disposed longitudinally of one another and further comprising subjecting the heating elements of the second strip to a zero heating time during thermal cycles of uneven order and subjecting the heating elements of the first strip to a zero heating time during cycles of even order.

5. A device for controlling a series-type thermal printing head for a printing system having at least one transfer strip of heating elements for printing dots on a recording medium, said device comprising:

(a) driving means for driving said head longitudinally at a given speed;

(b) heating means for heating said heating elements; and (c) computer-controller means for calculating heating times for each of the heating elements and controlling said heating times to subject the heating elements to a succession of thermal cycles, each cycle having a time duration less than or equal to a time required for the heating elements to print a dot on the recording medium, wherein (i) during a first half cycle of each of said cycles, each of the heating elements is subjected respectively to one of a non-zero and a zero initial heating time in accordance with whether a dot is to be printed or not printed by the respective heating element during said first half cycle of the thermal cycle, (ii) during a second half cycle of at least one of said cycles, at least one of the heating elements subjected to a non-zero initial heating time during said first half cycle is subjected to a second non-zero heating time to print an extended dot, and (iii) during a second half cycle of at least one of said cycles, at least one of the heating elements subjected to a zero initial heating time during said first half cycle is subjected to a second non-zero heating time to print an offset dot.

6. The device as in claim 5, wherein said computing-controller means comprises means for modulating a first half cycle heating time for heating a particular heating heating element to shorten said first half cycle heating time if said particular heating element has been heated during at least one of an immediately preceding first half cycle and second half cycle, and for modulating a second half cycle heating time for heating a given heating element to shorten said second half cycle heating time if said given heating element has been heated during at least one of an immediately preceding two first half cycles and an immediately preceding second half cycle.

7. The device as claimed in claim 5, wherein said computing means for calculating the heating time include:

a clock of a period at most equal to the time for printing the dots, a sequence generator, initiated by said clock for generating at least one high level sequential signal during the initial heating time, and at least one high level sequential signal during the heating time from the middle of the cycles, a decoder for determining, on the one hand, the heating elements to be subjected to initial heating and, on the other, the heating elements to be subjected to heating from the middle of the cycles, a logic circuit connected to said sequence generator and to said decoder for controlling said heating means.

8. The device as claimed in claim 7, wherein the sequence generator generates at least two sequential high level signals during the initial heating time and at least two sequential high level signals during the heating from the middle of the cycles, a delay circuit with several outputs is inserted between said decoder and said logic circuit, said logic circuit is connected to said outputs of said delay circuit and is adapted for modulating each heating time for a given heating element in the following way: the time of heating a heating element during a first half cycle is modulated and determined so as to shorten this time if this heating element has been heated during one of the two preceding half cycles and the time of heating a heating element during a second half cycle is modulated and determined so as to shorten this time if this heating element has been heated during one of the three preceding half cycles.

* * * * *